United States Patent [19]

Lauroesch

[11] 4,339,655
[45] Jul. 13, 1982

[54] LASER UNDERCUTTING SYSTEM

[75] Inventor: Hugo C. Lauroesch, Schenectady, N.Y.

[73] Assignee: General Electric Company, Schenectady, N.Y.

[21] Appl. No.: 229,279

[22] Filed: Jan. 28, 1981

Related U.S. Application Data

[63] Continuation of Ser. No. 4,201, Jan. 17, 1979, abandoned.

[51] Int. Cl.³ .............................................. B23K 27/00
[52] U.S. Cl. ............................. 219/121 LJ; 29/597; 219/121 LH; 219/121 FS
[58] Field of Search .................. 219/121 LJ, 121 LH, 219/121 LG, 121 FS, 121 L, 121 LM, 121 EH, 121 EJ, 121 EK, 121 EB, 121 EM; 310/42, 228; 29/597

[56] References Cited

U.S. PATENT DOCUMENTS

| | | | |
|---|---|---|---|
| 3,279,041 | 10/1966 | Boyer | 29/597 |
| 3,530,572 | 9/1970 | Helgeland | 29/602 R |
| 3,569,660 | 3/1971 | Houldcroft | 219/121 LH |
| 3,604,890 | 9/1971 | Mullaney et al. | 219/121 LG |
| 3,679,863 | 7/1972 | Houldcroft et al. | 219/121 LN |
| 3,750,049 | 7/1973 | Downey et al. | 331/94.5 Q |
| 3,860,784 | 1/1975 | Brown et al. | 219/121 LD |
| 3,876,409 | 4/1975 | Sangermano et al. | 65/40 |
| 4,048,464 | 9/1977 | Gale et al. | 219/121 LG |
| 4,150,278 | 4/1979 | Resener | 219/121 EK X |
| 4,170,726 | 10/1979 | Okuda | 219/121 FS X |

FOREIGN PATENT DOCUMENTS

| | | | |
|---|---|---|---|
| 2733082 | 2/1979 | Fed. Rep. of Germany | 29/597 |
| 1367767 | 9/1974 | United Kingdom . | |

OTHER PUBLICATIONS

Adams, "Introduction to Gas Jet Laser Cutting", *Metal Constr. & Brit. Weld Journal,* Jan. 1970, pp. 1–7.
Haun, Jr., "Laser Applications", *IEEE Spectrum,* May, 1968, pp. 82–91.

*Primary Examiner*—C. L. Albritton
*Attorney, Agent, or Firm*—Hedman, Casella, Gibson & Costigan

[57] ABSTRACT

A novel method of undercutting a silica base material is described which employs a laser beam. The method is especially useful in the manufacture of commutators having mica pads sandwiched between the segments.

14 Claims, 1 Drawing Figure

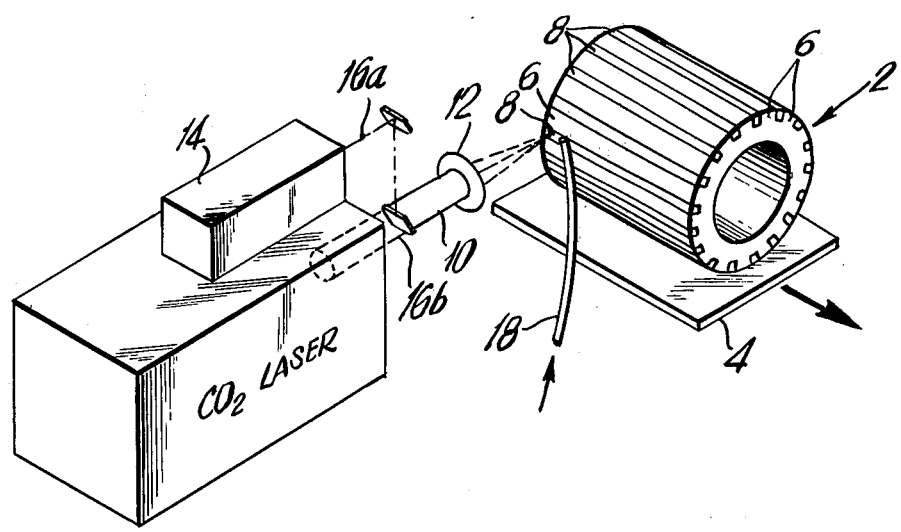

LASER UNDERCUTTING SYSTEM

This is a continuation, of application Ser. No. 4,201 filed Jan. 17, 1979. Parent application Ser. No. 4,201 filed Jan. 17, 1979 has been abandoned.

This invention relates to a laser undercutting system. More particularly, it relates to the use of a focused laser beam to ablate mica.

BACKGROUND OF THE INVENTION

It is known that lasers can be used to produce glass pH electrodes by melting a glass membrane in close contact with a glass casing, a line seal being effected. See Sangermano et al., U.S. Pat. No. 3,876,409, assigned to the assignee of the present application, and incorporated herein by reference.

One of the major limitations on the use of inorganic bonded silica materials, e.g., reconstituted mica paper for commutator segment plate or side mica is the excessive wear on undercutting tools, such as saws and the like. It would be of significant advantage to be able to undercut such materials without the need to expend such tools and such an advantage is an object of the present invention.

DESCRIPTION OF THE DRAWING

The drawing illustrates in perspective an assembly for undercutting in a preferred form.

DESCRIPTION OF THE INVENTION

According to the present invention there is provided a method of undercutting a silica base material below the surface of adjacent metal faces which comprises ablating said silica base material by means of a focused beam of a laser until a predetermined depth of undercut is obtained.

In the practice of the invention, any particular laser can be used so long as it has an effective wave length to be absorbed by the silica material and sufficient power and efficiency to fuse the surface of the silica material to permit its cutting away by erosion, melting, evaporation, vaporization and the like.

It is preferred to employ a molecular gas laser for this purpose having a wavelength corresponding to from about 5 to about 30 microns and especially preferred to employ a carbon dioxide laser, which has a 10.6 micron wavelength, to undercut mica. The 5 to 30 micron wavelength laser beam is uniquely suitable for commutator production because it is reflected from the copper segments thus eliminating potential error in the operation.

In preferred embodiments, undercutting of the mica is effected by mounting the mica workpiece on a workholder and moving the workholder relative to the focused beam to undercut a slot. If the mica forms segments of a commutator, the entire commutator can be moved relative to the beam. It is preferred during the ablating step to direct a high velocity stream of an inert gas, e.g., argon, into the focused beam to assist in cleaning away any molten silica material.

DESCRIPTION OF THE PREFERRED EMBODIMENTS

A conventional 64 segment copper commutator having 105 inch long mica pad insulators sandwiched in the slots is provided. The mica which is about 1.125 mm. thick must be undercut to a depth of 1 mm. The purpose of the undercut is to protect the brushes in a DC machine as the copper erodes with wear. Undercutting initially prevents excessive brush wear and secondly prevents brush vibration. If the brush is able to strike the mica and vibrate, the DC machine operating performance will be adversely affected.

With reference to the drawing, a commutator represented generally as 2 is placed on moveable worktable 4. Commutator 2 includes copper segments 6 and mica pads 8. The assembly is placed in the path of carbon dioxide laser beam 10 adjusted by lens 12 so that it impinges on the mica pad in the slot. The work table 4 is moved by a suitable motor (not shown) while a power of 320 watts is applied to 10.6 microns wavelength. A 1 mm. undercut will be produced if the surface of the mica is located 4.25 inches from a 100 mm focal length lens. This is a defocused position of 0.25 inches. This defocusing is necessary to vaporize mica over its full width of 1.125 mm. The mica is fed across the beam at a speed of 15 inches per minute. Not necessary, but desirable, is to employ HeNe laser 14 and mirror system 16a and b to direct a visible (0.6328 micron) beam to the work coaxially with invisible $CO_2$ laser beam 10. This allows the operator to make any necessary alignments.

Another preferred feature is to use a flow of inert gas through conduit 18 to protect the focusing lens and to assist in removing vaporized mica. Argon flowing at 30 cubic feed per minute is suitable.

It is to be understood that changes may be made in the particular embodiment of the invention in light of the above teachings, but that these will be within the full scope of the invention as defined by the appended claims.

I claim:

1. A method of undercutting a silica base material below the surface of adjacent metal faces which comprises ablating said silica base material by means of a focused beam of a laser until a predetermined depth of undercut is obtained.

2. A method as defined in claim 1 wherein the laser is a molecular gas laser having a wavelength in the range of from about 5 microns to about 30 microns.

3. A method as defined in claim 2 wherein the molecular gas laser is a carbon dioxide laser.

4. A method as defined in claim 1 wherein said silica base material is mica.

5. A method as defined in claim 4 wherein said mica is in the form of a reconstituted mica paper which is sandwiched between the metal segments of a commutator.

6. A method as defined in claim 5 wherein the commutator is caused to move relative to the focused laser beam whereby undercutting into a continuous slot is provided.

7. A method as defined in claim 1 wherein ablating is facilitated by directing a high velocity stream of inert gas into the silica base material at the point of contact with the focused beam of said laser.

8. A method as defined in claim 7 wherein said gas is argon.

9. The method of preparing a commutator comprising the steps of:
providing an elongated, generally cylindrical commutator structure including a plurality of elongated, axially extending metal segments separated by intermediate strips of inorganic bonded mica, with the radial dimensions of the metal segments substantially corresponding to the radial dimensions of the strips of intermediate inorganic bonded mica; and undercutting by ablation each strip of inorganic bonded mica by means of a focused beam of a laser until a predetermined depth of undercutting is obtained and simultaneously moving said commutator structure, parallel to the longitudinal axis thereof and relative to the focused laser beam thereby undercutting a continuous slot in each strip of inorganic bonded mica.

10. The method of preparing a commutator as in claim 9 wherein the laser is a carbon dioxide laser.

11. The method of preparing a commutator as in claim 10 wherein said undercut is one millimeter deep.

12. The method of preparing a commutator as in claim 11 wherein said laser beam is focused through a lens having a focal length of 100 mm. and wherein said commutator is located 4.25 inches from said lens.

13. The method of preparing a commutator as in claim 12 wherein said commutator structure is moved parallel to the longitudinal axis thereof at a rate of 15 inches per minutes.

14. A method as defined in claim 8 wherein said argon flows at a rate of 30 cubic feet per minute.

* * * * *